United States Patent [19]
Kuo et al.

[11] Patent Number: 6,092,000
[45] Date of Patent: Jul. 18, 2000

[54] METHOD FOR MAXIMIZING THE THROUGHPUT OF A MULTIPLE-STEP WORKSTATION IN A PLANT

[75] Inventors: Chun-Yen Kuo, Fen Shan; Yirn-Sheng Pan; Horng-Huei Tseng, both of Hsinchu, all of Taiwan

[73] Assignee: Vanguard International Semiconductor Corporation, Hsinchu, Taiwan

[21] Appl. No.: 08/958,968

[22] Filed: Oct. 28, 1997

[51] Int. Cl.$^7$ .................................................. G06F 19/00
[52] U.S. Cl. ............................................. 700/115; 700/97
[58] Field of Search .................................. 705/7; 710/45; 700/99, 103, 121, 116, 115, 111, 108, 104, 97, 75, 106, 107

[56] References Cited

U.S. PATENT DOCUMENTS

| 4,648,064 | 3/1987 | Morley ........................................ 710/45 |
| 5,105,362 | 4/1992 | Kotani ....................................... 700/121 |
| 5,375,061 | 12/1994 | Hara et al. ................................ 700/111 |
| 5,375,062 | 12/1994 | Aoki ......................................... 700/121 |
| 5,523,952 | 6/1996 | Inada ........................................ 700/111 |
| 5,764,520 | 6/1998 | Robinson et al. ....................... 700/116 |
| 5,856,923 | 1/1999 | Jones et al. .............................. 700/115 |

*Primary Examiner*—William Grant
*Assistant Examiner*—Kidest Bahta
*Attorney, Agent, or Firm*—Christensen O'Connor Johnson & Kindness PLLC

[57] ABSTRACT

A method for maximizing the throughput of a multiple-step workstation in a plant includes forming an interrecipe delay time array having rows of delay times for a plurality of lots $L_n$ with a plurality of recipes $R_n$ caused by a lot $L_{n-1}$ with a recipe $R_{n-1}$ for n=1 to a, and columns of delay times for a recipe $LR_n$ caused by a plurality of recipes $LR_{n-1}$ for n=1 to a. An array of feasible recipe-to-recipe sequences $S(n,m)$ is then formed having rows of feasible recipe-to-recipe sequences for the lot $L_n$ in a plurality of orders $O_m$ for m=1 to a, and columns of feasible recipe-to-recipe sequences for a plurality of lots $L_n$ in the order $O_m$ for m=1 to a. A recipe-to-recipe sequence in an order that is selected to be processed has a value of 1, and all other sequences in that order have a value of 0. Subsequently, a lot-recipe mapping array is formed that maps a recipe to be used for each lot. An objective function and a constraint function are formed, and may be typical linear programming functions. The objective function is solved subject to the constraint function using an integer programming solver to yield solution sets of recipe-to-recipe sequences having a value of 1. Finally, an optimal process of recipe-to-recipe sequences is formed from lots with minimum total delay times for orders $O_1$ through $O_m$.

9 Claims, 3 Drawing Sheets

Objective function:

$$\begin{aligned}
\text{Min } &S(1,1)*S(2,2)*F(1,2) + S(1,1)*S(3,2)*F(1,3) + S(1,1)*S(4,2)*F(1,4) + S(1,1)*S(5,2)*F(1,5) + \\
&S(2,1)*S(1,2)*F(2,1) + S(2,1)*S(3,2)*F(2,3) + S(2,1)*S(4,2)*F(2,4) + S(2,1)*S(5,2)*F(2,5) + \\
&S(3,1)*S(1,2)*F(3,1) + S(3,1)*S(2,2)*F(3,2) + S(3,1)*S(4,2)*F(3,4) + S(3,1)*S(5,2)*F(3,5) + \\
&S(4,1)*S(1,2)*F(4,1) + S(4,1)*S(2,2)*F(4,2) + S(4,1)*S(3,2)*F(4,3) + S(4,1)*S(5,2)*F(4,5) + \\
&S(5,1)*S(1,2)*F(5,1) + S(5,1)*S(2,2)*F(5,2) + S(5,1)*S(3,2)*F(5,3) + S(5,1)*S(4,2)*F(5,4) + \\
\\
&S(1,2)*S(2,3)*F(1,2) + S(1,2)*S(3,3)*F(1,3) + S(1,2)*S(4,3)*F(1,4) + S(1,2)*S(5,3)*F(1,5) + \\
&S(2,2)*S(1,3)*F(2,1) + S(2,2)*S(3,3)*F(2,3) + S(2,2)*S(4,3)*F(2,4) + S(2,2)*S(5,3)*F(2,5) + \\
&S(3,2)*S(1,3)*F(3,1) + S(3,2)*S(2,3)*F(3,2) + S(3,2)*S(4,3)*F(3,4) + S(3,2)*S(5,3)*F(3,5) + \\
&S(4,2)*S(1,3)*F(4,1) + S(4,2)*S(2,3)*F(4,2) + S(4,2)*S(3,3)*F(4,3) + S(4,2)*S(5,3)*F(4,5) + \\
&S(5,2)*S(1,3)*F(5,1) + S(5,2)*S(2,3)*F(5,2) + S(5,2)*S(3,3)*F(5,3) + S(5,2)*S(4,3)*F(5,4) + \\
\\
&S(1,3)*S(2,4)*F(1,2) + S(1,3)*S(3,4)*F(1,3) + S(1,3)*S(4,4)*F(1,4) + S(1,3)*S(5,4)*F(1,5) + \\
&S(2,3)*S(1,4)*F(2,1) + S(2,3)*S(3,4)*F(2,3) + S(2,3)*S(4,4)*F(2,4) + S(2,3)*S(5,4)*F(2,5) + \\
&S(3,3)*S(1,4)*F(3,1) + S(3,3)*S(2,4)*F(3,2) + S(3,3)*S(4,4)*F(3,4) + S(3,3)*S(5,4)*F(3,5) + \\
&S(4,3)*S(1,4)*F(4,1) + S(4,3)*S(2,4)*F(4,2) + S(4,3)*S(3,4)*F(4,3) + S(4,3)*S(5,4)*F(4,5) + \\
&S(5,3)*S(1,4)*F(5,1) + S(5,3)*S(2,4)*F(5,2) + S(5,3)*S(3,4)*F(5,3) + S(5,3)*S(4,4)*F(5,4) + \\
\\
&S(1,4)*S(2,5)*F(1,2) + S(1,4)*S(3,5)*F(1,3) + S(1,4)*S(4,5)*F(1,4) + S(1,4)*S(5,5)*F(1,5) + \\
&S(2,4)*S(1,5)*F(2,1) + S(2,4)*S(3,5)*F(2,3) + S(2,4)*S(4,5)*F(2,4) + S(2,4)*S(5,5)*F(2,5) + \\
&S(3,4)*S(1,5)*F(3,1) + S(3,4)*S(2,5)*F(3,2) + S(3,4)*S(4,5)*F(3,4) + S(3,4)*S(5,5)*F(3,5) + \\
&S(4,4)*S(1,5)*F(4,1) + S(4,4)*S(2,5)*F(4,2) + S(4,4)*S(3,5)*F(4,3) + S(4,4)*S(5,5)*F(4,5) + \\
&S(5,4)*S(1,5)*F(5,1) + S(5,4)*S(2,5)*F(5,2) + S(5,4)*S(3,5)*F(5,3) + S(5,4)*S(4,5)*F(5,4))
\end{aligned}$$

$$\begin{aligned}
= \; &S(1,1)*S(2,2)*2 + S(1,1)*S(3,2)*4 + S(1,1)*S(4,2)*1 + S(1,1)*S(5,2)*4 + \\
&S(2,1)*S(1,2)*4 + S(2,1)*S(3,2)*1 + S(2,1)*S(4,2)*2 + S(2,1)*S(5,2)*1 + \\
&S(3,1)*S(1,2)*2 + S(3,1)*S(2,2)*1 + S(3,1)*S(4,2)*4 + S(3,1)*S(5,2)*3 + \\
&S(4,1)*S(1,2)*3 + S(4,1)*S(2,2)*4 + S(4,1)*S(3,2)*2 + S(4,1)*S(5,2)*2 + \\
&S(5,1)*S(1,2)*2 + S(5,1)*S(2,2)*2 + S(5,1)*S(3,2)*3 + S(5,1)*S(4,2)*3 + \\
\\
&S(1,2)*S(2,3)*2 + S(1,2)*S(3,3)*4 + S(1,2)*S(4,3)*1 + S(1,2)*S(5,3)*4 + \\
&S(2,2)*S(1,3)*4 + S(2,2)*S(3,3)*1 + S(2,2)*S(4,3)*2 + S(2,2)*S(5,3)*1 + \\
&S(3,2)*S(1,3)*2 + S(3,2)*S(2,3)*1 + S(3,2)*S(4,3)*4 + S(3,2)*S(5,3)*3 + \\
&S(4,2)*S(1,3)*3 + S(4,2)*S(2,3)*4 + S(4,2)*S(3,3)*2 + S(4,2)*S(5,3)*2 + \\
&S(5,2)*S(1,3)*2 + S(5,2)*S(2,3)*2 + S(5,2)*S(3,3)*3 + S(5,2)*S(4,3)*3 + \\
\\
&S(1,3)*S(2,4)*2 + S(1,3)*S(3,4)*4 + S(1,3)*S(4,4)*1 + S(1,3)*S(5,4)*4 + \\
&S(2,3)*S(1,4)*4 + S(2,3)*S(3,4)*1 + S(2,3)*S(4,4)*2 + S(2,3)*S(5,4)*1 + \\
&S(3,3)*S(1,4)*2 + S(3,3)*S(2,4)*1 + S(3,3)*S(4,4)*4 + S(3,3)*S(5,4)*3 + \\
&S(4,3)*S(1,4)*3 + S(4,3)*S(2,4)*4 + S(4,3)*S(3,4)*2 + S(4,3)*S(5,4)*2 + \\
&S(5,3)*S(1,4)*2 + S(5,3)*S(2,4)*2 + S(5,3)*S(3,4)*3 + S(5,3)*S(4,4)*3 + \\
\\
&S(1,4)*S(2,5)*2 + S(1,4)*S(3,5)*4 + S(1,4)*S(4,5)*1 + S(1,4)*S(5,5)*4 + \\
&S(2,4)*S(1,5)*4 + S(2,4)*S(3,5)*1 + S(2,4)*S(4,5)*2 + S(2,4)*S(5,5)*1 + \\
&S(3,4)*S(1,5)*2 + S(3,4)*S(2,5)*1 + S(3,4)*S(4,5)*4 + S(3,4)*S(5,5)*3 + \\
&S(4,4)*S(1,5)*3 + S(4,4)*S(2,5)*4 + S(4,4)*S(3,5)*2 + S(4,4)*S(5,5)*2 + \\
&S(5,4)*S(1,5)*2 + S(5,4)*S(2,5)*2 + S(5,4)*S(3,5)*3 + S(5,4)*S(4,5)*3
\end{aligned}$$

FIG. 2A

Subject to:
$$S(1,1) + S(1,2) + S(1,3) + S(1,4) + S(1,5) = 1$$
$$S(2,1) + S(2,2) + S(2,3) + S(2,4) + S(2,5) = 1$$
$$S(3,1) + S(3,2) + S(3,3) + S(3,4) + S(3,5) = 1$$
$$S(4,1) + S(4,2) + S(4,3) + S(4,4) + S(4,5) = 1$$
$$S(5,1) + S(5,2) + S(5,3) + S(5,4) + S(5,5) = 1$$

$$S(1,1) + S(2,1) + S(3,1) + S(4,1) + S(5,1) = 1$$
$$S(1,2) + S(2,2) + S(3,2) + S(4,2) + S(5,2) = 1$$
$$S(1,3) + S(2,3) + S(3,3) + S(4,3) + S(5,3) = 1$$
$$S(1,4) + S(2,4) + S(3,4) + S(4,4) + S(5,4) = 1$$
$$S(1,5) + S(2,5) + S(3,5) + S(4,5) + S(5,5) = 1$$

| | | | | |
|---|---|---|---|---|
| $S(1,1) = 1$ or $0$, | $S(1,2) = 1$ or $0$, | $S(1,3) = 1$ or $0$, | $S(1,4) = 1$ or $0$, | $S(1,5) = 1$ or $0$ |
| $S(2,1) = 1$ or $0$, | $S(2,2) = 1$ or $0$, | $S(2,3) = 1$ or $0$, | $S(2,4) = 1$ or $0$, | $S(2,5) = 1$ or $0$ |
| $S(3,1) = 1$ or $0$, | $S(3,2) = 1$ or $0$, | $S(3,3) = 1$ or $0$, | $S(3,4) = 1$ or $0$, | $S(3,5) = 1$ or $0$ |
| $S(4,1) = 1$ or $0$, | $S(4,2) = 1$ or $0$, | $S(4,3) = 1$ or $0$, | $S(4,4) = 1$ or $0$, | $S(4,5) = 1$ or $0$ |
| $S(5,1) = 1$ or $0$, | $S(5,2) = 1$ or $0$, | $S(5,3) = 1$ or $0$, | $S(5,4) = 1$ or $0$, | $S(5,5) = 1$ or $0$ |

FIG. 2B

METHOD FOR MAXIMIZING THE THROUGHPUT OF A MULTIPLE-STEP WORKSTATION IN A PLANT

FIELD OF THE INVENTION

The present invention relates to source allocation in fabrication processes and, more particularly, to machine assignment in semiconductor integrated circuit (IC) fabrication processes. Still more particularly, the present invention relates to methods of modeling the throughput of a group of machines whereby the machine assignment can be optimized for maximum throughput in a multiple-step workstation in an IC plant.

BACKGROUND OF THE INVENTION

A typical process for manufacturing semiconductor IC devices may include more than one hundred process steps, which are usually classified into the following categories: diffusion; photolithography; etching; ion implantation; deposition; and sputtering. Among these categories, processes such as diffusion or deposition generally require a long process time to perform. Thus, these processes having long process times are commonly performed on several wafer lots (commonly referred to as a batch). For example, a typical diffusion process step takes four to twelve hours for simultaneously processing a batch of up to six lots.

Scheduling policy thus becomes an important task in managing a production system. For example, a scheduling policy may be optimized to maximize throughput of wafers out of the production system or factory; minimize the average time wafers spend in the factory to reduce the amount of work-in-progress (WIP); or maximize the utilization of machines (also referred to as tools). One aspect of production scheduling is controlling the release of pending jobs onto the processing floor (i.e., lot release). Another aspect of production scheduling is lot dispatching, which deals with the control of jobs already on the processing floor. More specifically, lot dispatching concerns scheduling which lot, or lots, of the WIP are to be processed when a machine becomes available.

In a typical, conventional multiple-step workstation, such as a workstation used in an integrated circuit (IC) fabrication plant, the throughput largely depends on the cycle time for lots waiting to be processed in a batch sequential-type machine. More specifically, the throughput is substantially related to delay time. Delay time is the time the present lot is waiting to be processed but, due to the preceding lot being processed, the present lot is not being processed or is not in transit between process steps. In this conventional method, the operator relies on his or her experience and judgment to decide which order is to be taken for dispatching the lots. This subjective method often results in inefficient use of the processing machines.

Accordingly, there is an unmet need in the art for a method for use in manufacturing semiconductor integrated circuit devices that maximizes the throughput of a multiple-step workstation.

SUMMARY OF THE INVENTION

In accordance with the present invention, a method is provided for maximizing the throughput of a multiple-step workstation, such as a workstation used in an integrated circuit fabrication plant. Throughput is maximized by minimizing total cycle time for lots waiting to be processed in a batch sequential-type machine. The workstation has a waiting pool buffer of lots waiting to be processed by the workstation. An nth lot $L_n$ in the waiting pool has a process time $PT_n$ and uses a recipe $R_n$. A delay time $DT_n$ is the time the lot $L_n$ is waiting to be processed, due to the lot $L_{n-1}$ being processed. The lot $L_n$ is not being processed or is not in transit between process steps during the delay time. The delay time $DT_n$ is a function $F(LR_{n-1}, LR_n)$ where $LR_{n-1}$ is the recipe used by the lot $L_{n-1}$, and $LR_n$ is the recipe used by the lot $L_n$. The total delay time is therefore a function of the processing sequence.

The method forms an interrecipe delay time array having rows of delay times for a recipe $LR_{n-1}$, caused by a plurality of recipes $LR_n$ for n=1 to a, and columns of delay times for a recipe $LR_n$ caused by a plurality of recipes $R_{n-1}$ for n=1 to a. An array of feasible recipe-to-recipe sequences $S(n,m)$ is formed having rows of feasible recipe-to-recipe sequences for a lot $L_n$ in a plurality of orders $O_m$ for m=1 to a, and columns of feasible recipe-to-recipe sequences for a plurality of lots $L_n$ in order $O_m$ from m=1 to a. A recipe-to-recipe sequence in an order that is selected to be processed has a value of 1, and all other recipe-to-recipe sequences in that order have a value of 0. A lot-recipe mapping array is formed that maps a recipe to be used for each lot. An objective function and a constraint function are formed, and may be typical linear programming functions. The objective function is solved subject to the constraint function using an integer programming solver to yield solution sets of sequences having a value of 1. An optimal process sequence is formed from lots with minimum total delay times for orders $O_1$ through $O_m$.

BRIEF DESCRIPTION OF THE DRAWINGS

The foregoing aspects and many of the attendant advantages of this invention will become more readily appreciated by reference to the following detailed description, when taken conjunction with the accompanying drawings, wherein:

FIG. 2A is an expansion of an objective function used in the present invention; and FIG. 2B is an expansion of a constraint function used in the present invention.

DESCRIPTION OF THE PREFERRED EMBODIMENT

Figure 1:
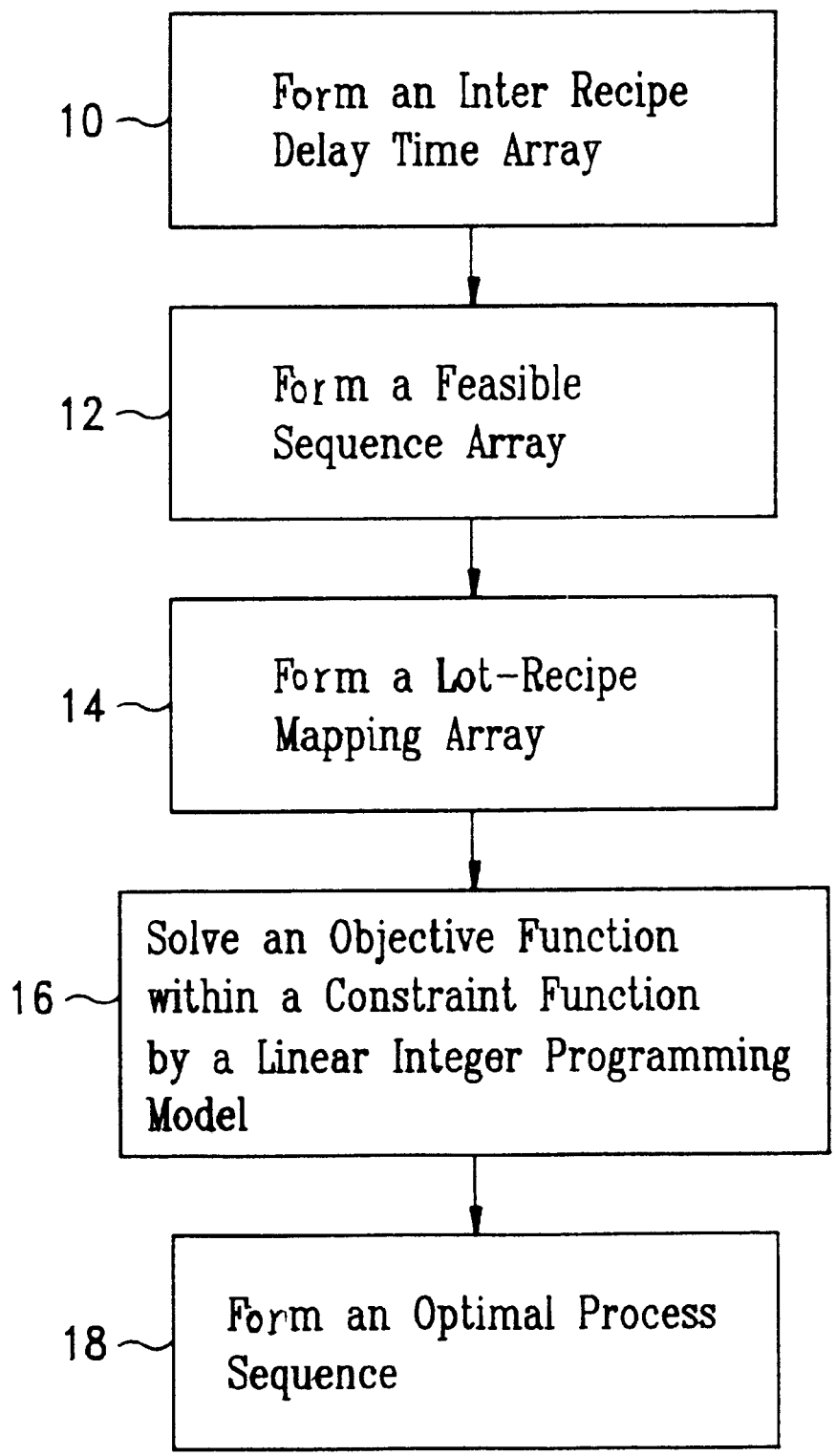
FIG. 1 is a flow chart of a method for maximizing the throughput of a multiple step workstation in an integrated circuit (IC) plant according to the present invention.

FIG. 1 is a flow chart of a method for maximizing the throughput of a multiple-step workstation in an integrated circuit (IC) plant according to one embodiment of the present invention. This embodiment is adapted for use with IC fabrication machines, and is advantageously used for a batch sequential-type machine. Specifically, in this embodiment, a part, also referred to as a lot, is processed in a stepper and an in-line track (usually together referred to as stepper set). The part generally passes through the following substeps: dehydrating baking, hexamethyldisilazane (HMDS) priming, spin coating, prebaking, exposure, post-exposure baking, developing, and post-baking.

Delay time usually occurs between a part currently being processed and the preceding part in the process flow because of differences in substep process times or because of substep requirements between the two adjacent parts. Delay time is defined as the time during which the part is waiting for the stepper set to process the preceding part, or the current part is in the stepper set but is not being processed, or is not being transferred. The delay time is therefore a function of the recipe of the part and the recipe of the preceding part, and the total delay time for a set of parts is the function of the processing sequence. The capacity of the whole plant thus becomes limited by the throughput of the stepper set when the "bottleneck" of the plant is the stepper. Therefore, when the method of the present invention is applied to the stepper set, the present invention improves the throughput of the stepper set, and therefore improves the throughput of the entire plant, by a proper arrangement of the process sequence according to the method described later. It will be appreciated by those skilled in the art that the application of the disclosed method can be applied to all multiple-step process workstations, although only the stepper set example is disclosed herein.

Generally, the workstation has a waiting pool buffer of lots waiting to be processed by the workstation. An nth lot $L_n$ in the waiting pool has a process time $PT_n$ and uses a recipe $R_n$, where n is an integer greater than zero, up to a maximum value of n=a. A delay time $DT_n$ is the time during which the lot $L_n$ is waiting to be processed, due to the lot $L_{n-1}$ being processed. However, the lot $L_n$ is not being processed or is not in transit between process steps during the delay time.

Referring to FIG. 1, an interrecipe delay time array is provided at a step 10. The interrecipe delay time array is shown in Table 1A. The delay time $DT_n$ caused by the lot $L_{n-1}$ in Table 1A is a function $F(LR_{n-1}, LR_n)$, wherein $LR_{n-1}$ is the recipe used by the lot $L_{n-1}$, and $LR_n$ is the recipe used by the lot $L_n$.

TABLE 1A

| Delay time | $R_1$ | $R_2$ | ... | $R_a$ |
|---|---|---|---|---|
| $R_1$ | F(1,1) | F(1,2) | ... | F(1,a) |
| $R_2$ | F(2,1) | F(2,2) | ... | F(2,a) |
| ... | ... | ... | ... | ... |
| $R_a$ | F(a,1) | F(a,2) | ... | F(a,a) |

The interrecipe delay time array has rows of delay times for a recipe $LR_{n-1}$ caused by a plurality of recipes $LR_n$ for n=1 to a, and columns of delay times for a recipe $LR_n$ caused by a plurality of recipes $LR_{n-1}$ for n=1 to a. This interrecipe delay time array is typically formed from information that is provided from records or from measurements. Table 1B shows an example of an interrecipe delay time array for one example of the stepper set embodiment.

TABLE 1B

| Delay time | $R_1$ | $R_2$ | $R_3$ | $R_4$ |
|---|---|---|---|---|
| $R_1$ | 1 | 4 | 3 | 2 |
| $R_2$ | 2 | 3 | 4 | 1 |
| $R_3$ | 3 | 2 | 1 | 4 |
| $R_4$ | 4 | 1 | 2 | 3 |

Referring back to FIG. 1, at a step 12, an array of feasible recipe-to-recipe sequences S(n,m) is formed. Depending upon the desired substeps to be performed, a lot may be included in a desired order of lots to be processed. It will be appreciated that a given lot may be processed in a plurality of orders, depending upon the desired substeps to be performed. On the other hand, it will also be appreciated that the given lot may not be processed in another plurality of orders, depending upon the desired substeps to be performed.

The array of feasible recipe-to-recipe sequences has rows of feasible recipe-to-recipe sequences for a lot $L_n$ for n=1 to a in a plurality of orders $O_m$ for m=1 to b, and columns of feasible recipe-to-recipe sequences for a plurality of lots $L_n$ for n=1 to a in order $O_m$ for m=1 to b. A recipe-to-recipe sequence in an order that is selected to be processed has a value of 1 when the lot is included in the order to be processed, and all other recipe-to-recipe sequences in that order have a value of 0. Table 2A generally lists a feasible sequence array formed in the step 12.

TABLE 2A

| | $O_1$ | $O_2$ | ... | $O_m$ |
|---|---|---|---|---|
| $L_1$ | S(1,1) | S(1,2) | ... | S(1,b) |
| $L_2$ | S(2,1) | S(2,2) | ... | S(2,b) |
| ... | ... | ... | ... | ... |
| $L_n$ | S(a,1) | S(a,2) | ... | S(a,b) |

Referring to Table 2A, S(a,b)=1 if lot a is to be processed in order b, and S(a,b)=0 if lot a is not to be processed in order b. Table 2B shows the feasible sequence array in one example of the stepper set embodiment.

TABLE 2B

| | $O_1$ | $O_2$ | $O_3$ | $O_4$ | $O_5$ |
|---|---|---|---|---|---|
| $L_1$ | S(1,1) | S(1,2) | S(1,3) | S(1,4) | S(1,5) |
| $L_2$ | S(2,1) | S(2,2) | S(2,3) | S(2,4) | S(2,5) |
| $L_3$ | S(3,1) | S(3,2) | S(3,3) | S(3,4) | S(3,5) |
| $L_4$ | S(4,1) | S(4,2) | S(4,3) | S(4,4) | S(4,5) |
| $L_5$ | S(5,1) | S(5,2) | S(5,3) | S(5,4) | S(5,5) |

Referring back to FIG. 1, at a step 14, a lot-recipe mapping array is formed that maps a recipe to be used for each lot. The lot-recipe mapping array is shown in Table 3A, wherein items in the left column are lots, and items in the right column are their corresponding mapped recipes. Information regarding the correspondence between lots and mapped recipes is generally available from plant records.

TABLE 3A

| Lot | Recipe |
|---|---|
| $L_1$ | $LR_1$ |
| $L_2$ | $LR_2$ |
| ... | ... |
| $L_n$ | $LR_n$ |

Referring to Table 3A, $LR_x$ generally represents the recipe used by the lot $L_x$. Referring now to Table 3B, the lot-recipe mapping array in one example of the stepper set embodiment is shown.

TABLE 3B

| Lot | Recipe |
|---|---|
| $L_1$ | $R_3$ |
| $L_2$ | $R_2$ |
| $L_3$ | $R_4$ |
| $L_4$ | $R_1$ |
| $L_5$ | $R_4$ |

Referring back to FIG. 1, at a step 16, an object function and a constraint function are formed by a typical linear integer programming technique. The linear programming technique disclosed in LINEAR PROGRAMMING IN SINGLE & MULTIPLE-OBJECTIVE SYSTEMS, Prentice-Hall Press, 1982, is used in a presently preferred embodiment, although any suitable linear programming technique may be used. The objective of the linear programming model is to yield a solution set, or sets, of the feasible recipe-to-recipe sequences having a value of 1. It will be appreciated that a recipe-to-recipe sequence having a value of 1 corresponds to a lot having a minimum delay time for the order to be processed. In a presently preferred embodiment, the objective function is shown in mathematical form below. An expansion of the objective function is shown in FIG. 2A.

Min $\Sigma$ $S(a,b)*S(c,b+1)*F(LR(a),LR(c))$ for a in $\{1,2, \ldots, n\}$, for c in $\{1,2, \ldots, n\}$, $a \neq c$, and b=1 to n−1.

The objective function is subject to a constraint function. The constraint function used in a presently preferred embodiment is shown in mathematical form below. An expansion of the constraint function is shown in FIG. 2B.

$S(a,b)=1$ or $0$, $\Sigma$ $S(a,b)=1$ for all given a, and $\Sigma$ $S(a,b)=1$ for all given b.

In light of this disclosure, it will be appreciated that those skilled in the art can program a standard computer to perform the linear programming technique without undue experimentation. According to the linear integer programming solver described above, it will be appreciated that a set of recipe-to-recipe sequences, each with a value of 1, corresponds to a set of lots each having a minimum delay time for its respective order to be processed. Therefore, the set of lots with minimum delay times for an order to be processed corresponds to a solution set of lots having a minimum total delay time. As an example, referring to the sample data provided in Tables 1B, 2B, and 3B, two sets of solutions yield a minimum total delay time. In the first set of solutions, recipe-to-recipe sequences $S(a,b)$ for a lot a and an order b shown below each have a value of 1, and are listed in Table 4A.

Set 1: $S(4,1)=1$; $S(3,2)=1$; $S(2,3)=1$; $S(5,4)=1$; and $S(1,5)=1$.

TABLE 4A

| | $O_1$ | $O_2$ | $O_3$ | $O_4$ | $O_5$ |
|---|---|---|---|---|---|
| $L_1$ | 0 | 0 | 0 | 0 | 1 |
| $L_2$ | 0 | 0 | 1 | 0 | 0 |
| $L_3$ | 0 | 1 | 0 | 0 | 0 |
| $L_4$ | 1 | 0 | 0 | 0 | 0 |
| $L_5$ | 0 | 0 | 0 | 1 | 0 |

For the second set of solutions, recipe-to-recipe sequences $S(a,b)$ for a lot a and an order b shown below each have a value of 1, and are listed in Table 4B.

Set 2: $S(4,1)=1$; $S(5,2)=1$; $S(2,3)=1$; $S(3,4)=1$; and $S(1,5)=1$.

TABLE 4B

| | $O_1$ | $O_2$ | $O_3$ | $O_4$ | $O_5$ |
|---|---|---|---|---|---|
| $L_1$ | 0 | 0 | 0 | 0 | 1 |
| $L_2$ | 0 | 0 | 1 | 0 | 0 |
| $L_3$ | 0 | 0 | 0 | 1 | 0 |
| $L_4$ | 1 | 0 | 0 | 0 | 0 |
| $L_5$ | 0 | 1 | 0 | 0 | 0 |

Finally, at a step 18, an optimal process of recipe-to-recipe sequences is formed from lots with minimum total delay times for orders $O_1$ through $O_m$. Generally, the formation of this optimal process sequence is shown in mathematical form below.

$O_x=a$, where $S(a,x)=1$ for x=1 to m

In this embodiment, according to the example data provided in Tables 4A and 4B, the optimal process sequence is shown below for optimal process sequence 1 and optimal process sequence 2, respectively.

Optimal Process Sequence 1: $L_4 \rightarrow L_3 \rightarrow L_2 \rightarrow L_5 \rightarrow L_1$ Optimal Process Sequence 2: $L_4 \rightarrow L_5 \rightarrow L_2 \rightarrow L_3 \rightarrow L_1$ Although specific embodiments including the preferred embodiment have been illustrated and described, it will be appreciated by those skilled in the art of dispatching systems that various modifications may be made without departing from the spirit and scope of the present invention, which is intended to be limited solely by the appended claims.

What is claimed is:

1. A method for maximizing throughput of a multiple-step workstation in a plant, the workstation having a waiting pool buffer of lots waiting to be processed by the workstation, an nth lot $L_n$ in the waiting pool having a process time $PT_n$ and using a recipe $R_n$, wherein a delay time $DT_n$ is the time the lot $L_n$ is waiting to be processed due to a preceding lot $L_{n-1}$ being processed, the lot $L_n$ not being processed or not being in transit between process steps during the delay time $DT_n$, n being an integer greater than zero, said method comprising:

forming an array of interrecipe delay times having a plurality of delay times for a plurality of lots $L_n$ caused by a plurality of lots $L_{n-1}$;

forming an array of feasible recipe-to-recipe sequences having a plurality of feasible recipe-to-recipe sequences for the plurality of lots $L_n$ and orders $O_m$ of lots, m being an integer greater than zero;

forming a lot-recipe mapping array that maps a recipe to be used with an associated lot, wherein each mapping is determined from past processing data;

generating an objective function for determining recipe-to-recipe sequences having lots with minimized delay times within an order to be processed;

determining a constraint function on the recipe-to-recipe sequences;

solving the objective function subject to the constraint function using an integer programming model; and forming a solution set of an optimal process of recipe-to-recipe sequences having lots in orders to be processed, wherein each lot in the optimal process has a minimum delay time for the order to be processed, the optimal process having a minimum total delay time for the orders to be processed.

2. The method according to claim 1, wherein said interrecipe delay time array comprises:

a plurality of rows of delay times for the plurality of lots $L_n$ with the plurality of recipes $R_n$ caused by the lot $L_{n-1}$ with a recipe $R_{n-1}$; and a plurality of columns of delay times for the lot $L_n$ caused by the plurality of lots $L_{n-1}$ with the plurality of recipes $R_{n-1}$.

3. The method according to claim 2, wherein said array of feasible recipe-to-recipe sequences comprises:

a plurality of rows of feasible recipe-to-recipe sequences for the lot $L_n$ in the plurality of orders $O_m$; and a plurality of columns of feasible recipe-to-recipe sequences for the plurality of lots $L_n$ in the order $O_m$.

4. The method according to claim 3, wherein each of said recipe-to-recipe sequences in an order that is selected to be processed has a value of 1, and all other recipe-to-recipe sequences in the order that is selected to be processed have a value of 0.

5. The method according to claim 1, wherein said delay time $DT_n$ is a function $F(LR_{n-1}, LR_n)$, wherein $LR_n$ is a recipe used by the lot $L_n$, and $LR_{n-1}$ is a recipe used by the lot $L_{n-1}$ preceding the lot $L_n$.

6. The method according to claim 1, wherein said integer programming model is a linear integer programming model.

7. A method for maximizing throughput of a multiple-step workstation in a plant, the workstation having a waiting pool buffer of lots waiting to be processed by the workstation, an nth lot $L_n$ in the waiting pool having a process time $PT_n$ and using a recipe $R_n$, wherein a delay time $DT_n$ is the time the lot $L_n$ is waiting to be processed due to a preceding lot $L_{n-1}$ being processed, the lot $L_n$ not being processed or not being in transit between process steps during the delay time $DT_n$, n being an integer greater than zero, said method comprising:

forming an array of interrecipe delay times having a plurality of rows of delay times for a plurality of lots $L_n$ with a plurality of recipes $R_n$ caused by a lot $L_{n-1}$ with a recipe $R_{n-1}$, and a plurality of columns of delay times for the lot $L_n$ with the recipe $R_n$ caused by a plurality of lots $L_{n-1}$ with a plurality of recipes $R_{n-1}$;

forming an array of feasible recipe-to-recipe sequences having a plurality of rows of feasible recipe-to-recipe sequences for the lot $L_n$ in a plurality of orders $O_m$, and a plurality of columns of feasible recipe-to-recipe sequences for a plurality of lots $L_n$ in the order $O_m$, m being an integer greater than zero;

forming a lot-recipe mapping array that maps a recipe to be used for an associated lot, wherein each mapping is determined from past processing data;

generating an objective function for determining the recipe-to-recipe sequences having lots with minimized delay times within an order to be processed;

determining a constraint function on the recipe-to-recipe sequences;

generating a linear integer programming model for solving the objective function subject to the constraint function; and forming a solution set of an optimal process of recipe-to-recipe sequences having lots in an order to be processed according to the linear integer programming model, wherein each lot in the optimal process has a minimum delay time for the order to be processed, the optimal process having a minimum total delay time for the orders to be processed.

8. The method according to claim 7, wherein each of said recipe-to-recipe sequences in an order that is selected to be processed has a value of 1, and all other recipe-to-recipe sequences in the order that is selected to be processed have a value of 0.

9. The method according to claim 7, wherein said delay time $DT_n$ is a function $F(LR_{n-1}, LR_n)$, wherein $LR_n$ is a recipe used by the lot $L_n$ and $R_{n-1}$ is a recipe used by the lot $L_{n-1}$ preceding the lot $L_n$.

* * * * *

UNITED STATES PATENT AND TRADEMARK OFFICE
CERTIFICATE OF CORRECTION

PATENT NO. : 6,092,000
DATED : July 18, 2000
INVENTOR(S) : C.-Y. Kuo et al.

It is certified that error appears in the above-identified patent and that said Letters Patent is hereby corrected as shown below:

COLUMN   LINE 8           28            "$R_{n-1}$" should read --$LR_{n-1}$--
(Claim 9,  line 3)

Signed and Sealed this

Eighth Day of May, 2001

Attest:

NICHOLAS P. GODICI

Attesting Officer    Acting Director of the United States Patent and Trademark Office